Figure 1:
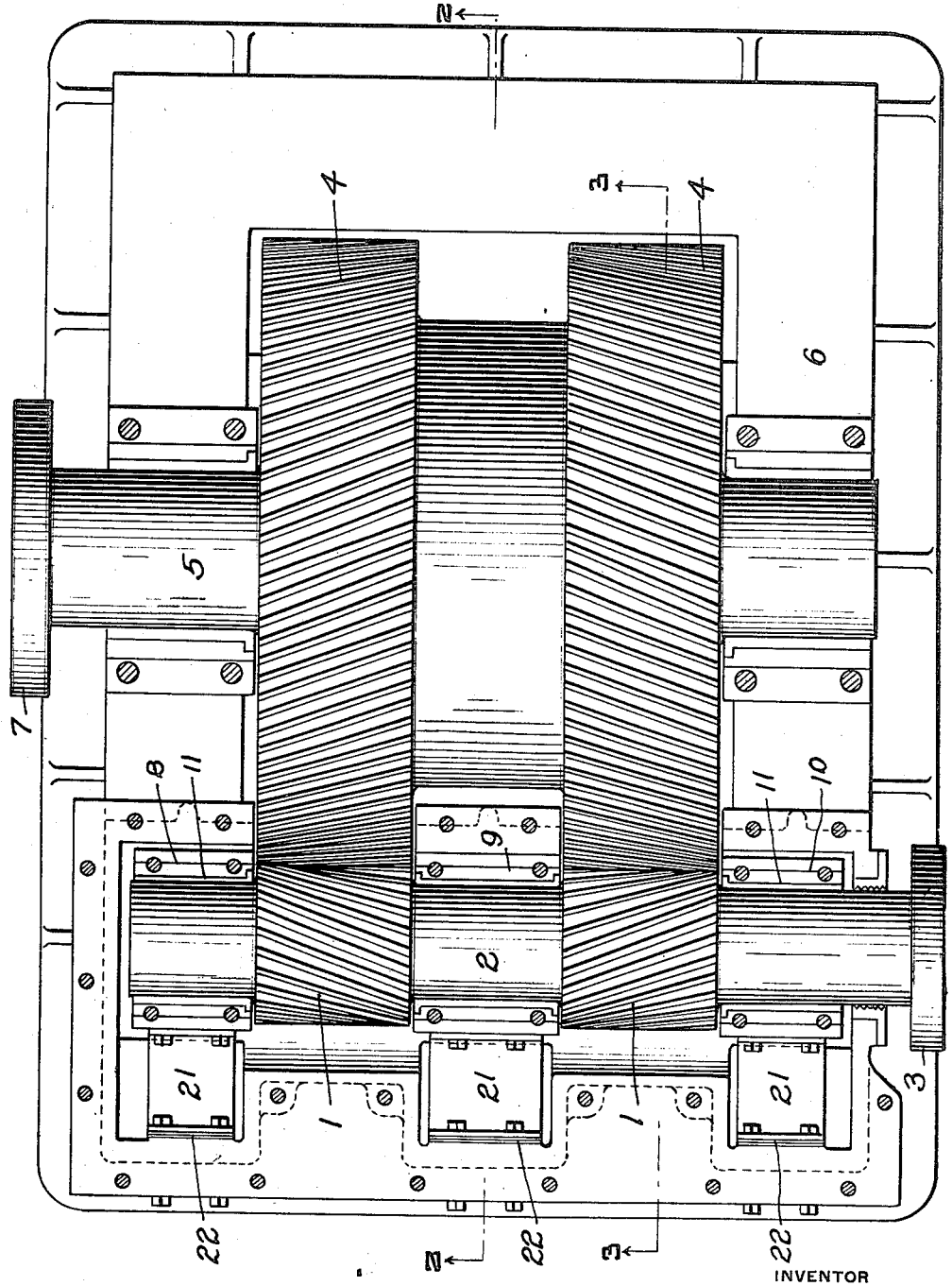

March 25, 1924.

H. A. S. HOWARTH

GEARING

Filed Aug. 4, 1919    6 Sheets-Sheet 1

1,488,119

INVENTOR
Harry A. S. Howarth
By Jno. S. Green
Attorney

March 25, 1924.
H. A. S. HOWARTH
GEARING
Filed Aug. 4, 1919    6 Sheets-Sheet 2
1,488,119
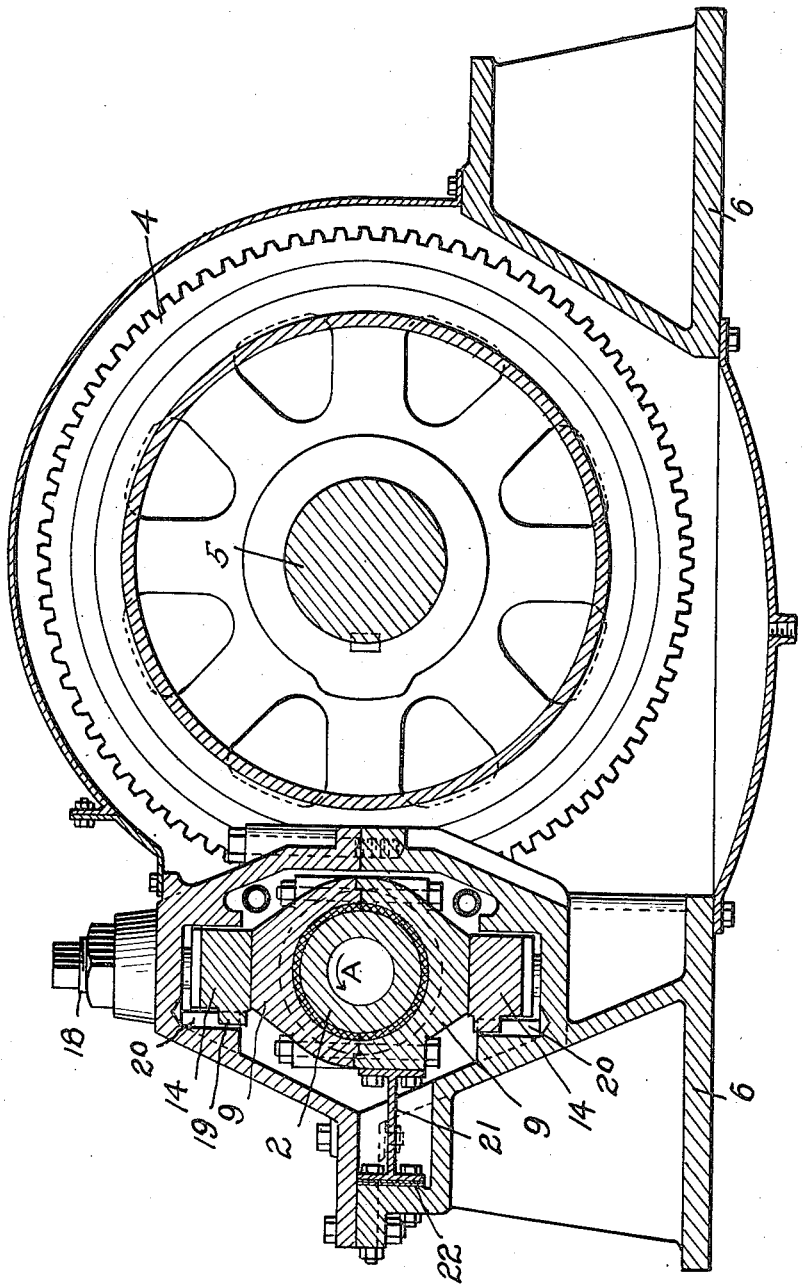
INVENTOR
Harry A. S. Howarth
By Jno. S. Green
Attorney.

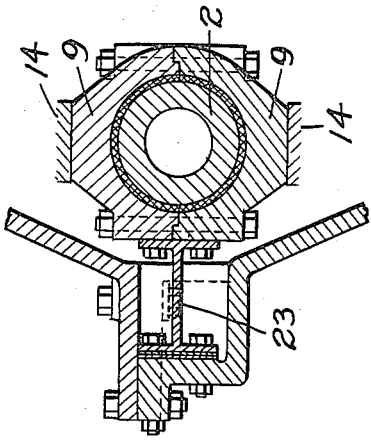
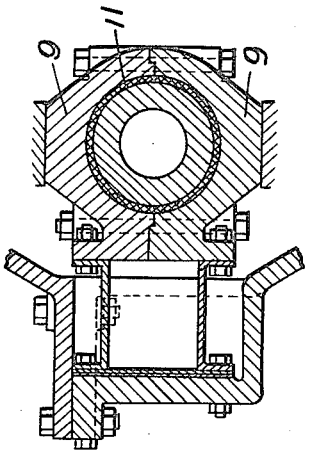
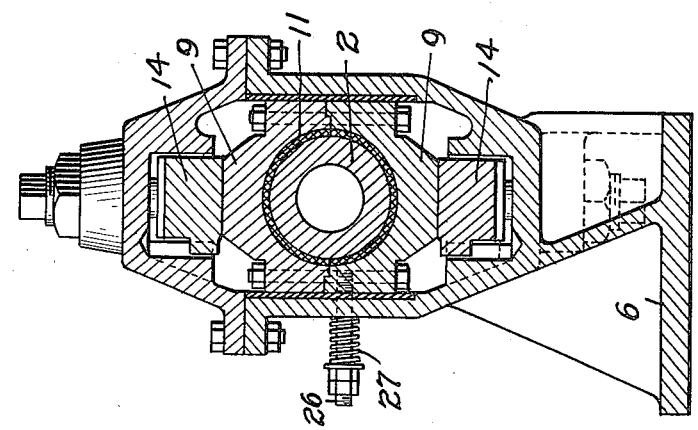
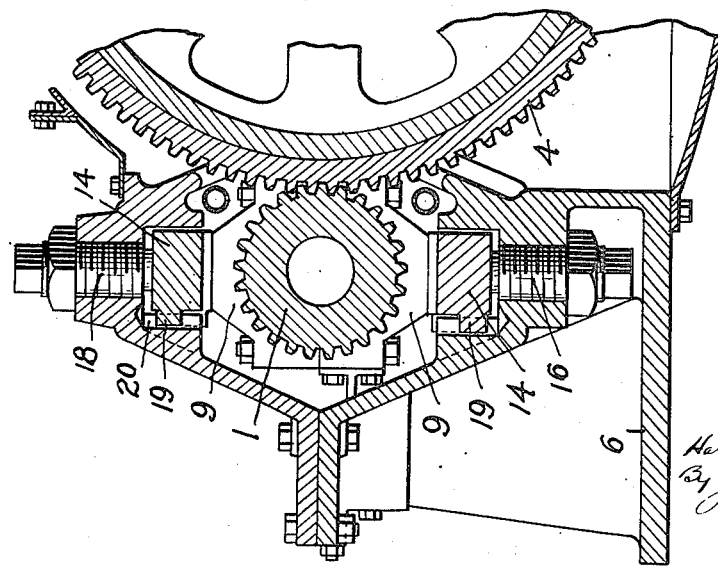

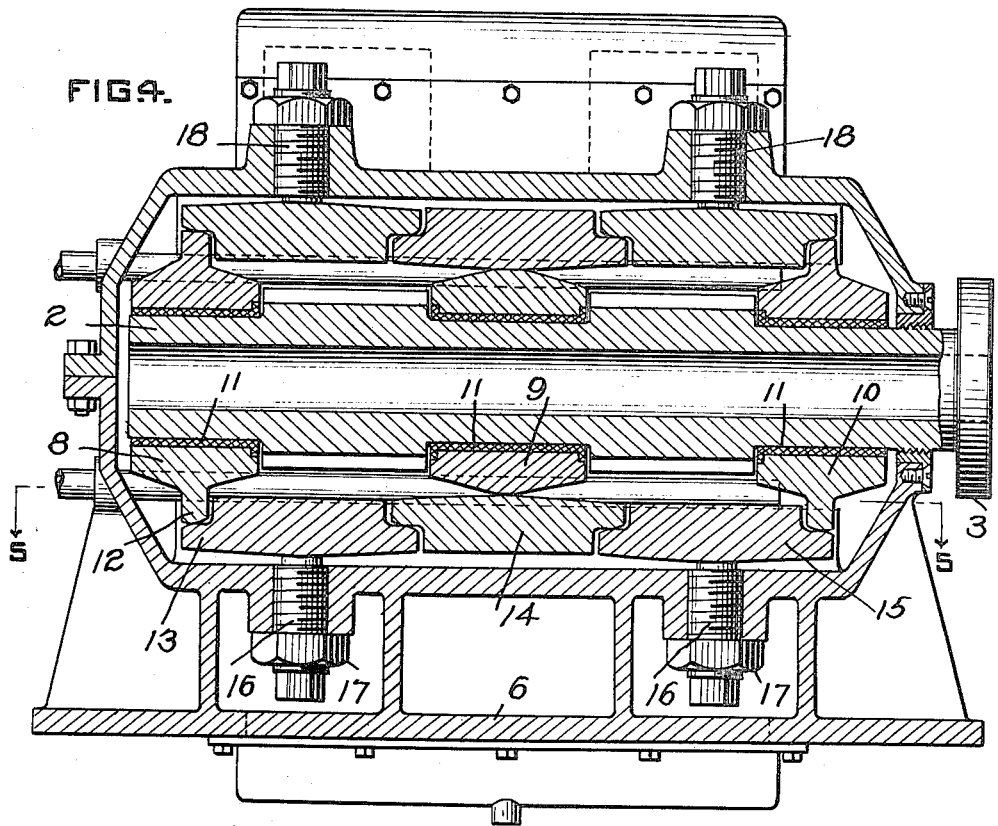
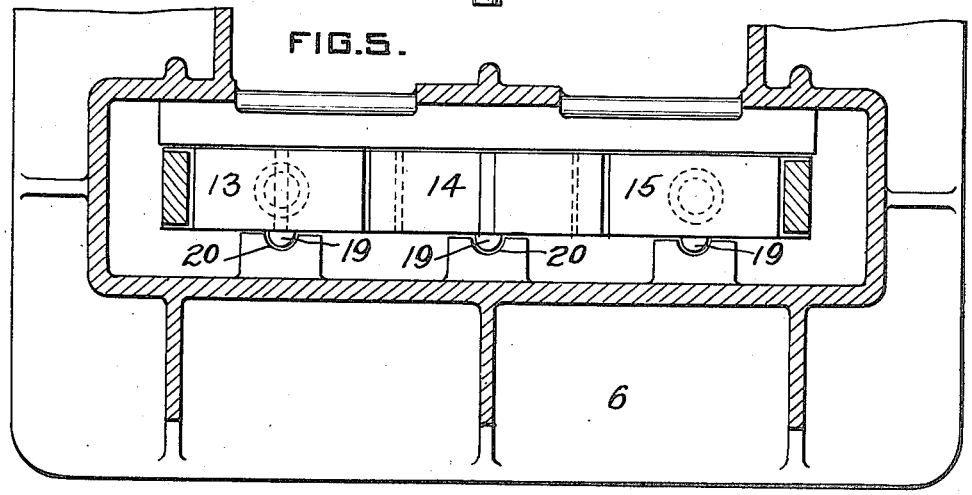

March 25, 1924.

H. A. S. HOWARTH

GEARING

Filed Aug. 4, 1919   6 Sheets-Sheet 5

1,488,119

INVENTOR
Harry A. S. Howarth
By Jno. S. Green,
Attorney.

March 25, 1924.

H. A. S. HOWARTH

GEARING

Filed Aug. 4, 1919     6 Sheets-Sheet 6

INVENTOR
Harry A. S. Howarth
By Jno. S. Green
Attorney.

Patented Mar. 25, 1924.

1,488,119

UNITED STATES PATENT OFFICE.

HARRY A. S. HOWARTH, OF PITTSBURGH, PENNSYLVANIA.

GEARING.

Application filed August 4, 1919. Serial No. 315,234.

*To all whom it may concern:*

Be it known that I, HARRY A. S. HOWARTH, a citizen of the United States, and a resident of Pittsburgh, in the county of Allegheny and State of Pennsylvania, have made a new and useful Invention in Gearing, of which the following is a specification.

My invention relates to gearing and particularly to such for the efficient transmission of large powers from high speed prime movers to comparatively slow speed machines.

It is well known that some types of prime movers are most efficient when operating at high speeds, while the machinery to be driven thereby can only work satisfactory at comparatively slow speeds. To transmit the power from such prime movers to such machines is the function of a reduction gearing such as I have designed.

The introduction of a reduction gearing involves, among other matters, problems of space, tooth friction and lubrication, tooth alinement and tooth strength. These items are of minor importance in ordinary commercial machinery but in very large power units, such as the turbine engines and propeller mechanisms of modern steamships, they assume formidable proportions. The use of large gears increases the dead weight which must be carried and the space occupied decreases the cargo tonnage. For these reasons, small diameters of gears and pinions are advisable and, in decreasing the diameters, the limiting features are the diameter of the pinion and its shaft.

The smaller the pinion diameter, the less the circular pitch of its teeth and consequently, the strength of the latter. To compensate for the decrease in the thickness of the teeth and retain strength to transmit the full load, the length of the tooth face may be substantially increased. Such increase necessarily increases the distance between the pinion shaft bearings and this permits deflection and torsional yielding of the shaft resulting in uneven pressures along the faces of the meshed teeth and upon the supporting bearings even tho the tooth and bearing contacts are uniformly disposed before power is applied.

Such uniform disposition would only be true in the event of mathematically perfect teeth and mathematically perfect alinement of the gear shaft and pinion shaft. Localized pressures produced by such deflection and torsional yielding, together with the minute inaccuracies in the teeth as manufactured and in the alinement of the shafts, increase the friction between meshing teeth and decrease the speed at which the gears may be run and decrease the wearing qualities and the effective strength of the teeth.

To provide means for distributing tooth pressures more equally than has been possible heretofore is one object of this invention. Another object is to maintain suitable bearing reactions along the pinion shaft without the usual tedious alinement of shaft bearings and in spite of disturbances in shaft bearings at different points due to above mentioned inequalities in the tooth pressures or any other causes tending to disturb alinement.

The means for attaining these objects is a flexible mounting of the pinion shaft which automatically adjusts it under unfavorable conditions however produced. Broadly, the device is a spur gearing consisting of a gear and pinion in which the pinion is journaled in bearings, preferably three in number, so constructed and mounted as to permit relative angular motion between the gear and pinion during operation, due to the varying tooth pressures encountered, allowing the pinion in twisting to roll upon the gear slightly until the tooth loadings are distributed as uniformly as possible. The differential movement of each of the pinion bearings permits such freedom as is necessary to allow the pinion bearings to assume natural positions. The pinion bearings are so mounted as to be movable in the common plane of the gear and pinion axes for the purpose of adjusting the position of the pinion shaft relative to the gear shaft and also of adjusting the enmeshment of the pinion and gear. The axes of the pinion and gear are normally in the same horizontal plane and the pinion bearings are mounted in such a way that they may be moved towards the gear, thereby varying the distance between the axes of the gear and pinion shafts without destroying their parallelism. The pinion bearings are also mounted on a system of levers so constructed as to provide an equalizing device which permits the pinion bearings interdependent movement in a plane substantially at right angles to the normal plane of the gear and pinion axes. Movement of the pinion bearings in the plane of the gear and pinion axes is limited by strut devices. The pinion shaft is also arranged so that it is capable of longitudinal motion thru its bearings.

Figure 6:
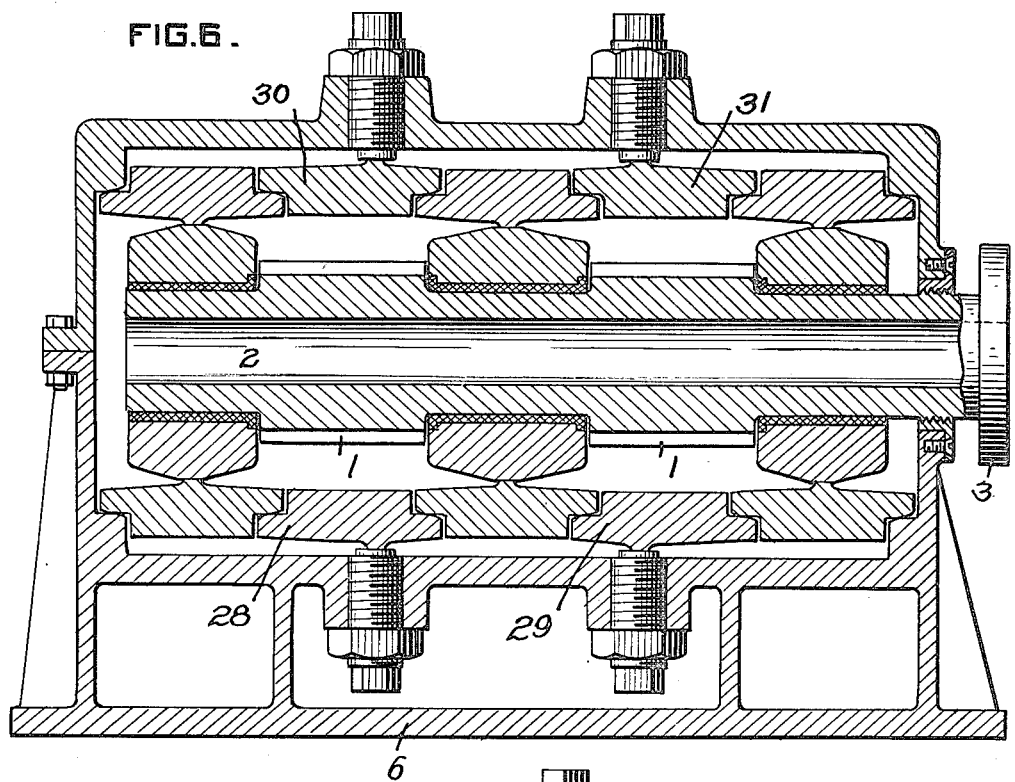

In the accompanying drawings I have illustrated my invention as constructed to be applied to a typical marine power plant in which a high engine speed is geared down to a suitable propeller speed. Figure 1 is a plan of a reduction gearing in which a large gear wheel is driven by a relatively small pinion, the latter supported by mountings embodying my invention; Fig. 2 is a vertical transverse section on the line 2—2 of Fig. 1; Fig. 3 is a similar section, but incomplete, on line 3—3 of Fig. 1; Fig. 4 is a vertical longitudinal section thru the axis of the pinion; Fig. 5 is a horizontal section on line 5—5 of Fig. 4; Fig. 6 is a section similar to Fig. 4 but showing a modified construction; Figs. 7, 8, 9, and 10 are sections similar to Fig. 2 but showing, respectively, modifications in the method of maintaining the relative lateral positions of gear and pinion shafts; Figs. 11, 12, 13, 14 and 15 are diagrammatic illustrations of the forces and reactions arising when the gear and pinion are being operated.

The pinions 1—1 are preferably integral with shaft 2 which is coupled at 3 to the engine shaft (not shown) and which drive gears 4—4 mounted on a shaft 5 journaled in the gear frame 6 in the usual manner. Shaft 5 is coupled at 7 to the propeller shaft (not shown) and the function of the gearing is to transmit the power of the engines to the propellers at greatly reduced speeds.

As shown in Fig. 1, the teeth of one pinion are cut with a right hand helix and the other with a left hand helix and the gears 4—4 are cut to correspond. As the teeth of the respective, enmeshed pinions and gears are cut at angles equally opposed, in opposite directions to the shafts' axes, longitudinal stability of the pinions and gears is obtained.

Pinion shaft bearings 8, 9, and 10 may be two or more in number; my preferred number is three. The bearings are spaced from each other and each is provided with an ordinary bushing 11 and each bearing is preferably split into semi-circular upper and lower units. The functions and supporting means of the upper series of units are the same as those of the lower series and I shall describe in detail only the latter.

Each unit, opposite its bearing surface, has an integral fulcrum 12. The fulcrums of all units on the lower side of shaft 2 are pivotally mounted on a series of interdependent levers 13, 14 and 15. Two levers, 13 and 15 are pivotally supported on gear frame 6 and one lever, 14, is interposed between levers 13 and 15 and wholly supported at its ends upon the adjacent ends of the latter levers.

It is evident that any point in the length of the shaft is free to enjoy a limited movement in the vertical plane in which the shaft axis lies but the effect of such movement upon the adjacent bearing is transmitted in part to each of the other bearings. For example, suppose a slight downward movement of that portion of the shaft supported by bearing 8. This will result in a downward movement of the adjacent end of lever 13 which is fulcrumed at its center and will therefore rise at its opposite end and raise the left hand end of lever 14. Suppose the center of bearing 9 remains stationary; the right hand end of lever 14 will be depressed thus giving lever 15 a movement opposite to that of lever 13 which raises bearing 10. But if the center of bearing 9 moves up, instead of remaining stationary, the upward movement of bearing 10 will decrease proportionally and may even change to a downward movement.

By similarly tracing the reactions due to either upward or downward movement of any bearing, it will be observed that any one bearing may move in either direction and, if either of the others remain stationary at their central point, the third bearing will move in the opposite direction; or, any two bearings may move in one direction but will be accompanied by a movement of the third bearing in the opposite direction. The system of levers does not provide for any simultaneous movement of all three bearings in the same direction.

Such simultaneous movement may be desirable for adjusting the pinion shaft as a whole to any required vertical position. To secure this adjustment, I support levers 13 and 15 on the ends of screws 16 in the gear frame 6. Lock nuts 17 secure the position of screws 16. Other suitable adjustment means may be substituted for screws 16.

It will be understood that the upper levers operate complementary to the lower levers. The upper screws 18 cooperate with screws 16 to adjust shaft 2 and by means of these screws, the entire system of levers may be placed under an initial stress to prevent vibration and any play between opposed levers when the direction of rotation of shaft 2 is reversed.

Obviously, any excess pressure exerted on one part of the shaft will be distributed by the equalizing levers to all the bearings, a distribution which would be impossible if the bearings were fixed as is the case in the "floating frame" type of gears, one of which is described in United States Letters Patent 946,455 and in which the pressure distribution is dependent upon the integral tilting of the "floating frame." Unless the frame is rigid, which is impossible, dangerous concentrations of tooth pressures are apt to occur.

To prevent longitudinal displacement of levers 13, 14 and 15, one side of each lever is provided with a vertical rib 19 fitting loosely in grooves 20 in frame 6.

The shaft mounting herein described limits the vertical departure of the pinion shaft from a normal position. To prevent its horizontal movement away from the gear shaft and to maintain the enmeshment of the gears 1, I provided struts 21 and shims 22 between frame 6 and each of the lower bearing units. These struts are of such shape that the compressive strength of their webs will enable them to resist horizontal movement of the pinion away from the gear while the transverse strength will be so small that the strut is somewhat flexible transversely so that it will not seriously interfere with the vertical movements of the shaft bearings necessary to maintain even tooth and bearing pressures.

Figure 9:
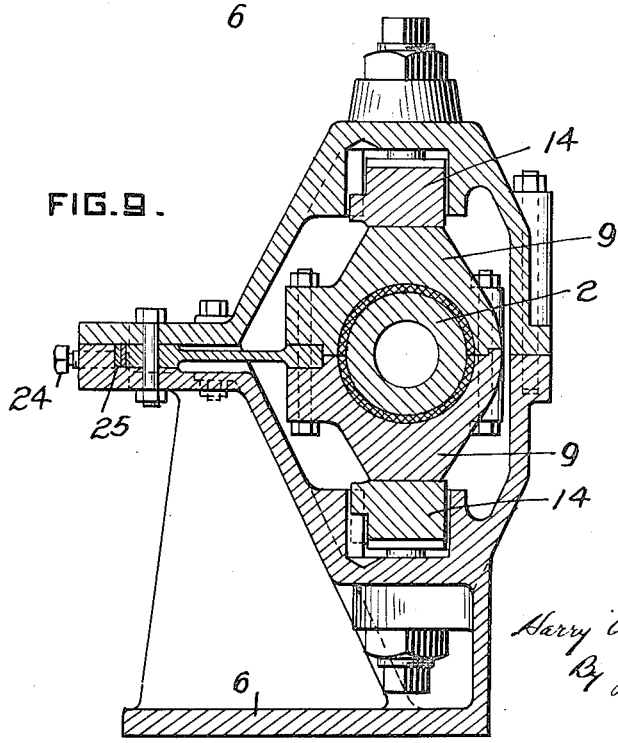

Each strut is preferably of I beam shape and both sides of its inner flange are secured to the lower unit of its respective bearing. This construction is based on an assumption that the pinion 1 will only be driven in the direction indicated by the arrow A, in which case all the bearing reactions will be on the lower half of the bearings and only those units will require lateral bracing. If the direction of the pinion rotation is to alternate, this construction may still be used but it may be preferred to utilize some of the modified forms because of the symmetry of their construction. Fig. 7 illustrates an I beam strut 23 so assembled that the opposite sides of its inner flange are secured to upper and lower units of the bearing respectively and it will resist equally well any movement of the shaft bearings in a horizontal direction regardless of the direction in which the shaft is driven. Figs. 8 and 9 illustrate modifications in the strut construction and application. In Fig. 9 the horizontal limitation of the bearing movement is rendered adjustable by means of screws 24 or shims 25 or both. In Fig. 10 the frame 6 is shaped to closely approach the bearing sides and no strut is used. By use of bolt 26, which is threaded into the bearing and passes thru the frame, and compression spring 27, the bearing sides are always maintained in contact with the frame or a shim between the frame and the bearing.

Fig. 6 illustrates a modified construction of bearings in which the levers 28, 29, 30 and 31 are placed off center. By varying the amount of this eccentricity, the bearing reactions at different points of the shaft may be made any relative amounts desirable and this predetermined relation will be maintained irrespectively of the quantity or application point of pressure.

Figure 11:
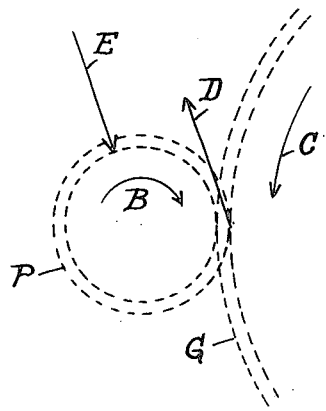
Figure 12:
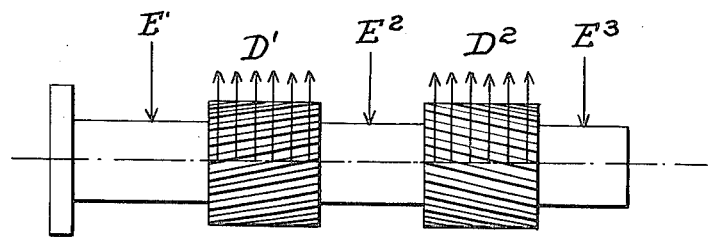

I will now explain the advantages of my construction over the devices in use at present. Referring to Fig. 11, pinion P is assumed to be rotating in the direction indicated by arrow B and driving the gear G in the direction indicated by arrow C. The reaction of the gear teeth against the pinion teeth is shown by arrow D. Balancing this reaction is the bearing pressure indicated by arrow E. These two forces form a couple which is balanced by the driving torque. Referring now to Fig. 12 and considering the vertical components of the forces involved; the pressure of the gear teeth on the pinion teeth is assumed to be uniformly distributed, and is represented by a number of arrows $D^1$, $D^2$ of equal length. The bearing reactions are three and are marked $E^1$, $E^2$ and $E^3$. If we neglect the transverse strength of the pinion at the middle bearing, that bearing would take a load equal to the sum of the other two, provided, the three bearings were mounted in a perfectly rigid frame, and the tooth pressures were uniformly distributed.

Figure 13:
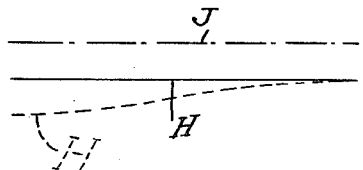

The pinion shaft shown in Fig. 12 is driven from the coupling end F. Let Fig. 13 illustrate an element H in the pinion pitch surface which is straight and parallel with the axis J before the load is applied. Assuming the gear to be relatively rigid, when the load is applied the pinion twists and element H assumes a spiral form as is shown exaggerated by the broken line, The spiral pitch of this spiral will gradually change according to the distance of its points from the driven end of the pinion shaft. This twisting will continue until the pinion has rolled around the gear far enough to distribute the tooth loadings fairly uniformly. But such twisting will be impossible unless the pinion axis can shift to correspond. Hence when the pinion bearings are held as nearly parallel as possible, as in a rigid frame, there will be unavoidable concentrations of tooth pressures which will be prohibitive if the pinion is slender.

The mounting which I propose for the pinion bearings allows the pinion axis to assume freely whatever position it requires. It also insures an unalterable distribution of the bearing reactions no matter whether the pinion axis remains straight or not.

Figure 14:
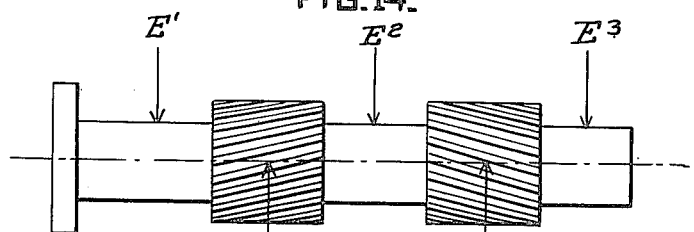
Figure 15:
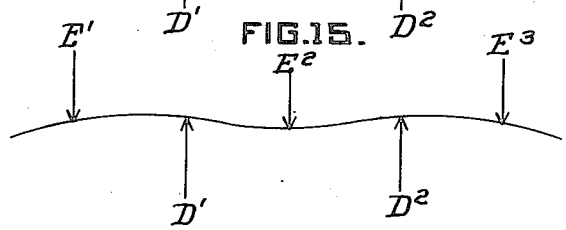

Assume the tooth pressures to be concentrated at the middle of each pinion, as shown in Fig. 14 by $D^1$ and $D^2$. The pinion shaft, when acted upon by forces $E^1$, $E^2$ and $E^3$ must evidently be distorted as shown in Fig. 15. Considering this transverse bending combined with the twisting, it is evident that a slender pinion could only have an approximately equal distribution of tooth pressures when the bearing reactions are of predetermined amounts and when those bearings are free to assume the position they are constrained to take by the deflections that exist.

In attaining the objects of more equally distributed tooth and bearing pressures, other attending advantages are secured by my reduction gearing.

I secure more efficient lubrication, as the value of a lubricant depends mainly upon its capacity to form and maintain a film, and an oil film will not withstand pressures varying in amount and point of application nearly so well as pressures evenly applied. The viscous properties of the oil are destroyed by the dividing and disintegrating influences of the first condition but are not so easily affected by the uniform pressures of the latter condition which is assured by my construction.

Cheaper material may be used for both the pinion and gears owing to the absence of the large factor of safety demanded of inflexible gears by the likelihood of localized pressures. Under similar loads and speeds, my gear teeth do not need the reserve strength which is only secured by the use of expensive steel alloys. Or, with the same quality of material and the same accuracy of workmanship much better results will be obtained by my gear.

The necessity of exact alinement of the several bearings of the pinion shaft is eliminated entirely.

My gearing makes it possible to neglect the consequences of the springing of the gear frame when bolted to its bed or when subsequently distorted by the rolling or twisting of the ship. It will also assist in taking care of conditions due to unequal expansion of the gear and pinion or uneven expansion of one of them, as the mechanism will automatically compensate for such disturbances. Some forms of inaccuracies in the gear cutting will prove less objectional with my construction than heretofore and I believe that it will make unnecessary a considerable amount of hand work now employed in fitting the gear teeth and pinion.

Having thus described my invention, what I claim is—

1. In gearing, a gear wheel provided with a shaft journaled in fixed bearings, and a pinion meshing with said gear and provided with a pinion mounting consisting of a shaft journaled in a plurality of bearings having relative movement transversely of the axis of said pinion, and interdependent lever means pivotally supporting said bearings whereby movement of one of said bearings is accompanied by a complementary movement of one or more of the other of said bearings without disturbing the alinement of said bearings.

2. In a machine, a frame, a shaft, and means for mounting said shaft in the machine comprising fulcrums on said frame, interdependent elements pivoted on said fulcrums, and alined shaft bearings adapted to move relatively to each other across the axis of said shaft and pivoted on said elements and maintained in alinement by reciprocal movement of said elements.

3. In gearing, a pinion, a gear meshing therewith and driven thereby, a shaft for said pinion, bearings for said shaft, and interdependent articulated supports for said bearings which distribute the total bearing pressure among all of said bearings, and are limited in operation to a tilting movement.

4. In combination with meshed gears, fixed bearings for one of said gears, pivoted bearings for the other of said gears, supports for said pivotal bearings adapted to rock in a plane approximately at right angles to the plane passing thru the normal axis of said gears and means preventing other movement of said supports.

5. Means for mounting a gear shaft within a machine frame comprising opposed supports on said frame, articulated levers rocking on said supports, bearings pivoted on said levers and members for independently adjusting said supports relatively to said frame without disturbing the alinement of said bearings.

6. In combination with intermeshed gears, fixed bearings for one of said gears, floating bearings for the other gear, interdependent pivotally mounted means supporting said floating bearings, and means for adjusting the relative positions of said supporting means.

7. In combination with intermeshing gears, fixed bearings for one of said gears, floating bearings for the other gear, interdependent levers for supporting said floating bearings and means for adjusting the fulcrum point of one of said levers.

8. In combination with intermeshing gears, floating bearings for one of said gears, pivotally mounted levers for supporting said bearings, and means for adjusting the position of at least one of said levers.

9. In combination with intermeshing gears, floating bearings for one of said gears, pivotally mounted levers for supporting said bearings, means for adjusting the position of at least one of said levers, and flexible means for limiting the movement of said floating bearings to motion in substantially one plane.

10. In combination in a transmission gearing, a gear frame, a gear shaft journaled in said frame, a gear mounted thereon, a pinion meshing with said gear, a plurality of bearings for said pinion, co-operative levers between said bearings and said frame whereby varying pressures on each of said bearings is transmitted in predetermined proportion to the other bearings and occasions only a tilting of said levers.

11. In combination in a transmission gearing, intermeshing gears, floating bearings for one of said gears, interdependent elements for supporting said bearings adapted to permit relative motion thereof in a plane at right angles to the plane defined by the normal positions of the axes of the gears and so arranged that relative motion of said bearings occasions only a tilting of said elements.

12. In combination in a transmission gearing, intermeshing gears, floating bearings for one of said gears whereby the relative angular position of the gears may automatically vary, and interdependent tiltable supporting elements for said bearings, so arranged that relative motion of said bearings occasions only a tilting of said elements.

13. In combination in a transmission gearing, intermeshing gears, floating bearings for one of said gears, opposed bearing supports, and a series of interdependent support levers between each support and said bearings, each series including a separate lever fulcrumed at a point intermediate its ends on one of said bearings, and a lever fulcrumed on one of said supports and supportingly engaging an end of each adjacent bearing-engaging lever.

14. In combination in a transmission gearing, intermeshing gears, floating bearings for one of said gears, a bearing support, and a series of interdependent support levers between said support and said bearings, each series including a separate lever fulcrumed at a point intermediate its ends on one of said bearings, and a lever fulcrumed at a point intermediate its ends on said support and supportingly engaging an end of each adjacent bearing engaging lever.

15. In combination in a transmission gearing, intermeshing gears, floating bearings for one of said gears, a series of interdependent support levers for said bearings, comprising a separate lever fulcrumed at a point intermediate its ends so as to tiltingly engage one of said bearings, an intermediate lever fulcrumed at a point intermediate its ends and supportingly engaging an end of each adjacent bearing engaging lever, and means for varying the position of the fulcrum of the intermediate lever.

In testimony whereof, I have hereunto subscribed my hand this 5th day of July 1919.

HARRY A. S. HOWARTH.